(12) United States Patent
Bhattacharya et al.

(10) Patent No.: US 8,386,790 B2
(45) Date of Patent: Feb. 26, 2013

(54) METHOD OF USING ECDSA WITH WINTERNITZ ONE TIME SIGNATURE

(75) Inventors: Debojyoti Bhattacharya, Bangalore (IN); Arzad A. Kherani, Mahasamund (IN)

(73) Assignee: GM Global Technology Operations LLC, Detroit, MI (US)

( * ) Notice: Subject to any disclaimer, the term of this patent is extended or adjusted under 35 U.S.C. 154(b) by 508 days.

(21) Appl. No.: 12/712,349

(22) Filed: Feb. 25, 2010

(65) Prior Publication Data

US 2011/0208971 A1    Aug. 25, 2011

(51) Int. Cl.
*H04L 9/32* (2006.01)
*H04L 9/00* (2006.01)
*H04K 1/00* (2006.01)
*H04L 9/28* (2006.01)

(52) U.S. Cl. ............ 713/177; 713/180; 380/23; 380/25; 380/28; 380/49; 380/50; 380/59

(58) Field of Classification Search .................. None
See application file for complete search history.

(56) References Cited

U.S. PATENT DOCUMENTS

| | | | | |
|---|---|---|---|---|
| 4,881,264 | A * | 11/1989 | Merkle ........................ | 713/177 |
| 6,230,272 | B1 * | 5/2001 | Lockhart et al. ................. | 726/2 |
| 6,415,385 | B1 * | 7/2002 | Cotugno et al. ............. | 713/176 |
| 8,082,446 | B1 * | 12/2011 | Carroll ......................... | 713/176 |

FOREIGN PATENT DOCUMENTS

| | | |
|---|---|---|
| DE | 102009015967 A1 | 12/2009 |
| DE | 60312659 T2 | 12/2011 |

OTHER PUBLICATIONS

M. Luk, et al., "Seven Cardinal Properties of Sensor Network Broadcast Authentication," Proc. of the 4th ACM workshop on Security of ad hoc and sensor networks, 2006.

R.C. Merkle, "A Certified Digital Signature," in Proceedings of Crypto 89, ser. Lecture Notes in Computer Science, G. Brassard, Ed., vol. 435. Springer-Verlag, 1989, pp. 218-238.

N.S.C. Dods, et al., "Hash Based Digital Signature Schemes," in 10th IMA International Conference on Cryptography and coding, ser Lecture Notes in Computer Science, N.P. Smart, Ed., vol. 3796. Springer, Dec. 2005, pp. 96-115.

M. Szydlo, "Recent Improvements in the Efficient Use of Merkle Trees: Additional Options for the Long Term," http://www.rsa.com/rsalabs/node.asp2=2003.

* cited by examiner

*Primary Examiner* — Nathan Flynn
*Assistant Examiner* — Trang Doan

(57) ABSTRACT

A method is provided of authenticating a digitally signed message. A chain of messages is generated. A Winternitz pair of keys is generated for each respective message. A sequence number is assigned to each of the messages. Each of the sequence numbers cooperatively identify an order of Winternitz verifiers assigned to each of the messages. A signature to a first message in the chain of messages is signed using a digital signature algorithm private key. Signatures to each of the following messages in the chain of messages are signed using both Winternitz private keys and digital signature algorithm private keys. The signed messages are broadcast from a sender to a receiver. The first signed broadcast message is authenticated at the receiver by verifying the digital signature algorithm signature. At least some of the following signed broadcast messages are authenticated at the receiver by verifying only the Winternitz signature.

20 Claims, 4 Drawing Sheets

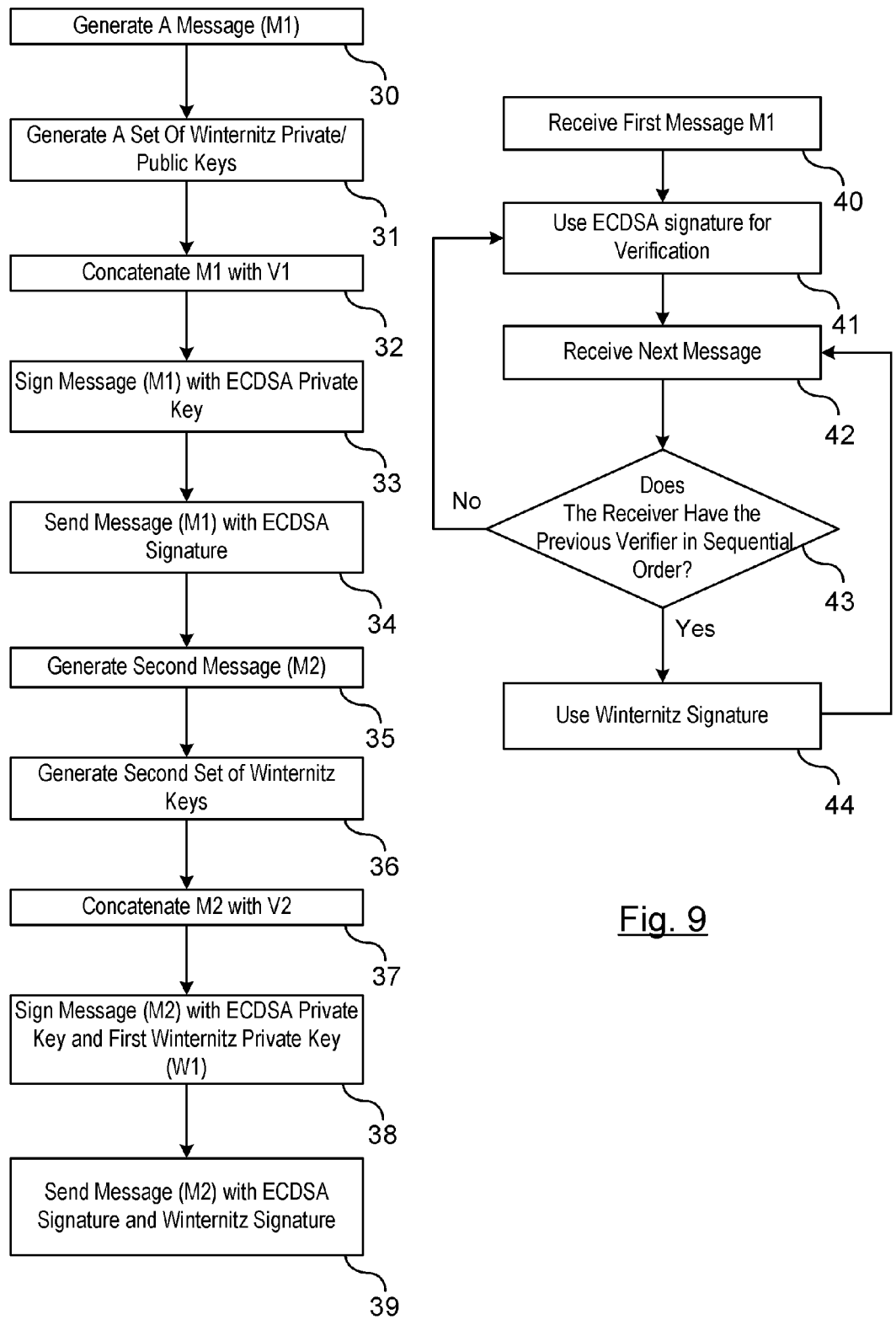

METHOD OF USING ECDSA WITH WINTERNITZ ONE TIME SIGNATURE

BACKGROUND OF INVENTION

An embodiment relates generally to broadcast authentication schemes in vehicle-to-entity communications.

Digital signatures are used to authenticate broadcast messages when communicated over a communication medium that is shared by the public such as over the air, wireless communication channels. There are a plurality of broadcast authentication schemes known in the art, however, each of the schemes have a deficiency (e.g., not robust) to a respective communication property. The tradeoff of many of the communication schemes is between efficiency of communication, computation times to authenticate, or the susceptibility to an attack of the message. The properties which robustness is sought includes delayed verification, packet loss, computational DoS attack, repudiation, and mobility. Therefore, having a broadcast scheme that is robust to each of the properties described herein is highly desirable.

SUMMARY OF INVENTION

An advantage of an embodiment is the robustness of fused broadcast authentication schemes with respect to each property that are typically present during broadcasting digitally signed messages. The fusing of the two broadcast authentication schemes cooperatively overcomes the deficiencies of each individual broadcast scheme while maintaining the robustness for each of the properties.

An embodiment contemplates a method of authenticating a digitally signed message. A chain of messages is generated. A Winternitz pair of keys is generated for each respective message. A sequence number is assigned to each of the messages. Each of the sequence numbers cooperatively identify an order of Winternitz verifiers assigned to each of the messages. A signature to a first message in the chain of messages is signed using a digital signature algorithm private key. Signatures to each of the following messages in the chain of messages are signed using both Winternitz private keys and digital signature algorithm private keys. The signed messages are broadcast from a sender to a receiver. The first signed message is authenticated at the receiver by verifying the digital signature algorithm signature. At least some of the following signed broadcast messages are authenticated at the receiver by verifying only the Winternitz signature.

An embodiment contemplates a method of authenticating a digitally signed message. A first message is generated. A first set of Winternitz keys is generated. A verifier is concatenated with the first message. A first sequential number is assigned to the message and verifier. The message is signed using a digital signature algorithm private key. The first message is broadcast to a remote entity. A second message is generated. A second set of Winternitz keys are generated. A second verifier is concatenated with the second message. A second sequential number is assigned to the second message and second verifier. The second message is signed using the first Winternitz private key and the digital signature algorithm private key. The second digital message is transmitted with the Winternitz signature and the digital signature algorithm signature. The first message is received. The first message is verified using the digital signature algorithm signature. The second message is verified using only the Winternitz signature in response to obtaining a sequentially identified verifier of the first message.

BRIEF DESCRIPTION OF DRAWINGS

FIG. 9 is a flowchart of a method for chaining messages and verifiers using a combined W-OTS and ECDSA broadcast scheme.

DETAILED DESCRIPTION

Figure 1:
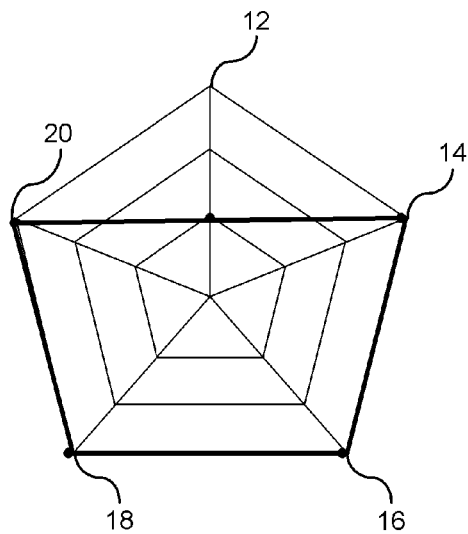
FIG. 1 is a robustness property diagram for an ECDSA broadcast algorithm scheme.

V2X communication systems such as vehicle-to-vehicle (V2V) or vehicle-to-entity communication systems rely on digital signatures to assure authenticity of a broadcast message from a sender (i.e., transmitting vehicle or entity) to a receiver (i.e., receiving vehicle or entity). Digital signature schemes are mathematical schemes that are used to demonstrate an authenticity of a digital broadcast message. A valid digital signature provides a recipient of the message assurance that the received broadcast message was created by a known sender. Moreover, the valid digital signature provides further assurance that the digital message was not altered during the transmission of the message. Digital signatures are a deterrent to tampering or forgery of a message. Forgery of a message involves generating a message by an entity of other the known sender whereas tampering involves a third party intercepting the message and changing the contents of the message.

Digital signatures typically use a form of cryptography. Messages are typically transmitted through unsecured communication channels when using a communication network which is used in the public domain. The digital signature provides a recipient assurance that the message was sent by the sending party and was received by the recipient in an un-altered state.

Broadcast authentication schemes using digital signatures assist to overcome known issues with the transmission of a message between a sender and a recipient. The robustness of broadcast authentication schemes is influenced by the following:

Non-repudiation assures that the signer of the digital message cannot successfully state that the signer did not sign a message while stating that their private key used to sign the message remains secret.

Packet loss is when one or more packets of data traveling across a communication medium fail to reach the recipient.

Resilience to computational denial-of-service (DoS) is the ability to deter an attempt to make a resource unavailable to its intended users. Typically, an entity attempting to carry out a DoS consists of the concerted efforts of an entity to prevent a service, site, server or verifier from functioning efficiently either temporarily or indefinitely.

A common method of attack involves saturating the receiver or service/site/server/verifier with external communications requests so that the entity attempting to respond cannot do so or responds so slowly that the responding entity becomes basically unavailable. In summary, DoS attacks are implemented by consuming resources so that the recipient can no longer communicate effectively.

Delayed verification involves a verification of a message. A message should be able to be verified instantly.

Support for mobility involves a dynamic environment such as a vehicle communication in which the receiver set changes frequently. To support mobility of a signing node so that its neighbors can verify the messages signed by the sender, a digital certificate of the signer's public key needs to be broadcast and made available to its neighbors receiving the broadcast message.

Broadcast authentication schemes used to authenticate messages using digital signatures include, but are not limited to, Winternitz one-time-signature (OTS), Digital Signature Algorithm (DSA), Elliptical Curve Digital Signature Algorithm (ECDSA), RSA (Rivest, Shamir, Adleman protocol), and Time Efficient Stream-Loss Authentication (TESLA). All of the broadcast schemes described herein are robust with respect some of the properties characteristics described above; however, each scheme is has little or no robustness to at least one characteristic to some degree.

Figure 2:
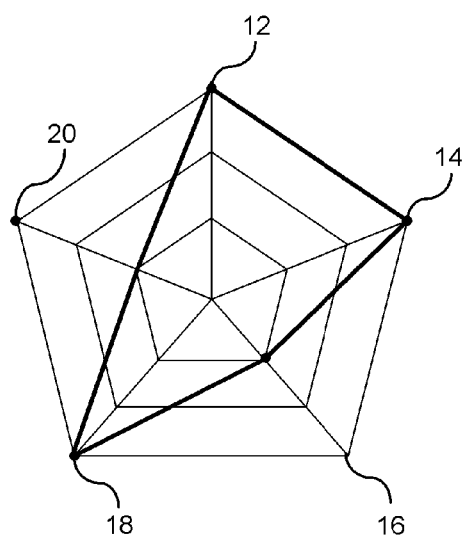
FIG. 2 is a robustness property diagram for W-OTS broadcast algorithm scheme.
Figure 3:
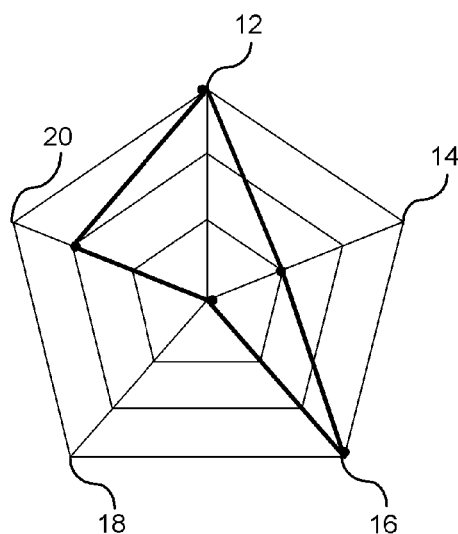
FIG. 3 is a robustness property diagram for TESLA broadcast algorithm scheme.
Figure 4:
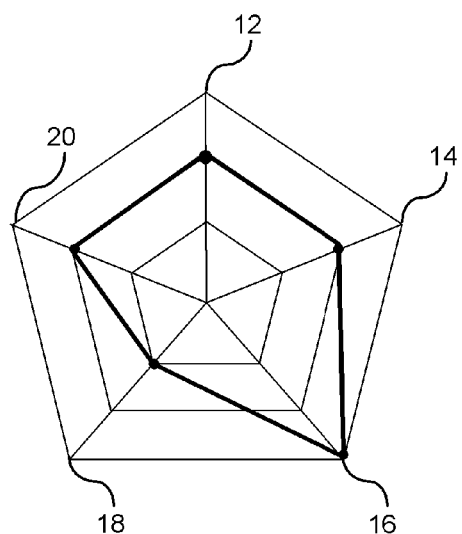
FIG. 4 is a robustness property diagram for TADS broadcast algorithm scheme.

FIGS. 1-4 are association graphs of the above mentioned broadcast authentication schemes and their robustness to each property. FIG. 1 illustrates an ECDSA scheme, FIG. 2, illustrates a Winternitz one time signature (W-OTS) scheme, FIG. 3 illustrates a TESLA scheme, and FIG. 4 illustrates a TADS scheme. The darkened line represents the robustness to a respective property. The center of the pentagon shape represents a deficiency in the robustness of a respective property whereas the outer periphery of the pentagon shape represents a greater degree of robustness. Those stages transitioning between the center and the periphery represent increasing robustness. It should be understood that the degrees of robustness as identified in each of the figures are exemplary and are provided only to provide a general indication the deficiencies or robustness of each respective technique. The respective properties shown in FIGS. 1-4 are identified as the resilience to computational DoS 12, immediate verification 14, robustness to packet loss 16, non-repudiation 18, and support for mobility 20.

FIG. 1 illustrates ECDSA authentication scheme in relation to each of the properties. In an ECDSA authentication scheme, every message can be verified instantly when received if the public key is available with the verifier thereby avoiding delay verification. The ECDSA authentication scheme is also robust to packet loss as a loss of one packet does not stop the verification process of subsequent messages. The ECDSA authentication scheme offers non-repudiation to every packet successfully verified using ECDSA authentication scheme. A trusted third party based digital certificate ensures this property. The ECDSA authentication scheme also provides support for mobility when the digital certificate of the signer's public key is broadcasted. The only property where the ECDSA is not robust is computational DoS particularly in a resource constrained system. Computational overhead for ECDSA signing and verification is very high when operations are carried out in systems with limited computational power.

FIG. 2 illustrates a comparison of a robustness of the Winternitz one-time-signature (OTS) broadcast authentication scheme in relation to each of the properties. The security of the Winternitz (W-OTS) authentication scheme relies on a one-way property and collision resistance property of a used hash function. The W-OTS authentication scheme achieves instant verification of messages as every message can be verified instantly when received if the public key is available with the verifier thereby avoiding delay verification. The W-OTS authentication scheme is resilient against computational DoS attack. A verification of W-OTS requires computation of hash functions only, which takes less time to compute as compared to asymmetric key operations such as ECDSA. W-OTS authentication scheme can achieve non-repudiation successfully to every packet. W-OTS enables non-repudiation using a digital certificate by a trusted third party on every verifier. It should be understood that the W-OTS authentication scheme guarantees non-repudiation so long as a trace of the messages is provided to a third party by the receiver. The W-OTS authentication scheme does support mobility and is not robust is packet loss. If the W-OTS verifiers are chained where a previous verifier is used to verify the next verifier, then the chain is broken if one message within the chain of messages are not received by the receiving party. As a result, packets received subsequent to the lost packet cannot be verified due to the missing verifier.

An embodiment as described herein utilizes a two scheme construction for obtaining robustness to each of the properties. The preferred combination of the two scheme construction utilizes the W-OTS authentication scheme and the ECDSA authentication scheme. It should be understood that in alternative embodiments authentication schemes such as DSA or RSA or any other digital signature algorithms having similar properties of ECDSA maybe substituted for ECDSA. ECDSA is preferred due to a higher security level with lower key size compared to the alternative schemes.

ECDSA is a digital signature algorithm based on public key cryptography that can be used for broadcast authentication. In cryptography such as ECDSA, each user U has two keys: a public key $K_{UPub}$ and a private key $K_{UPv}$. The public key $K_{UPub}$ is made public, whereas the private key $K_{UPv}$ is kept secret. To digitally sign a message M, a user U must first compute a short representative m=H(M) of M using a hash function H. Subsequently, the user U applies a signature generation operation to obtain $S_U$=sgn(m, $K_{UPv}$). The pair (M, $S_U$) is the message M signed by U. Any entity having access to the public key of U can verify the authenticity of U's signature on message M. A single public/private key pair can be used to sign unlimited number of messages theoretically. Recall that only the user U can generate the signature since the user U only has knowledge of private key. Anybody can verify the signature as the public key information is made available in the public. Therefore, as long as the private key is kept private, this setting can be used for broadcast authentication for all messages transmitted by the user U. However, it is understood that to enable the non-repudiation property in this setting, presence of a trusted third party is required which issues the digital certificate to the user U and binds the identity of the user U and the public key $K_{UPub}$ together. The trusted third party system is commonly referred to as a public key infrastructure PKI. The use of the digital certificate enables any verifier who correctly verifies the message-signature pair signed by U to prove in front of any third party that the messages are indeed signed by user U. The detail mathematical specifics of the ECDSA broadcast algorithm will not be discussed herein, but it should be understood that ECDSA is a known broadcasting authentication scheme and the advantage of the embodiment is that it is cooperatively utilized with the W-OTS broadcast scheme to overcome the deficiencies in robustness of both authentication schemes.

The W-OTS broadcast algorithm as discussed earlier relies on a one-way property and a collision resistance property of the used hash function. Algorithms 1, 2, and 3, set forth below illustrate W-OTS key generation, signature generation, and signature verification, respectively:

---

Algorithm 1-Winternitz Key Pair Generation

Input: Hash function $G:\{0,1\}^* \to \{0,1\}^{2L}$, $H:\{0,1\}^* \to \{0,1\}^L$, and block parameter k and n = 2l/k.
Output: Signature key S; Verification key V.
1. Choose n and k so that 2L = n*k.
2. Choose $s_0, s_1, \ldots, s_n, \in_R \{0,1\}^L$ uniformly at random, i.e., choose n+1 random variables of length L,
3. Set $S = s_0, s_1, \ldots, s_n$,
4. Compute $y_i = H^{2^k}(s_i)$ for i = 1, 2, ... n,
5. Compute $z = H^{n*2^k}(s_0)$,
6. Compute $V = H(y_1 \| y_2 \| \ldots y_n \| z)$ where $\|$ denotes concatenation,
7. Private key: = S, Public key: = V
8. Return (S,V)

Algorithm 2-Winternitz Signature Generation

Input: Hash function $G:\{0,1\}^* \to \{0,1\}^{2L}$, $H:\{0,1\}^* \to \{0,1\}^L$, and block parameter k and n = 2l/k, message M, signature key S.
Output: One time signature key $\sigma_m$ on M; Verification key V.
1. Compute G(M) from M
2. Break G(M) in 'n', k − bit words $b_1, b_2, \ldots, b_n$,
3. Set $S = s_0, s_1, \ldots, s_n$,
4. Compute $b_0 = \sum_{i=1}^{n} b_i$,
5. The signature of M is $$\sigma_m = \lfloor H^{b_1}(s_1) \| H^{b_2}(s_2) \| \ldots H^{b_n}(s_n) \| H^{n*2^k - b_0}(s_0) \rfloor,$$

Return $\sigma_M$.

Algorithm 3-Winternitz Signature Verification

Input: Hash function $G:\{0,1\}^* \to \{0,1\}^{2L}$, hash function $H:\{0,1\}^* \to \{0,1\}^L$, and block parameter k and n = 2l/k, message M, signature $\sigma_m$, Verification key V.
Output: TRUE if signature is valid, False otherwise.
1. Compute $b_1, b_2, \ldots, b_n, b_0$ as in Algorithm 2,
2. Denote $\sigma_M$ received as composed of $\hat{h}_1 \| \hat{h}_2 \| \ldots \| \hat{h}_n \| \hat{h}_0$,
3. Compute $x_i = H^{2^k - b_i}(\hat{h}_i)$ for i = 1, 2, ..., n,
4. Compute $\omega = H^{b_0}(\hat{h}_0)$,
5. Compute $V' = H(x_1 \| x_2 \| \ldots \| x_n \| \omega)$,
6. If V' = V then return TRUE, otherwise FALSE.

---

The W-OTS broadcast authentication scheme uses two cryptographic hash functions namely $H: \{0,1\}^* \to \{0,1\}^L$ and $G: \{0,1\}^* \to \{0,1\}^{2L}$, L is the security level required in bits, and parameter k indicates the number of bits that are processed simultaneously. Since collision resistance is required for the initial hashing of the data to sign the message and the one-way property is required for the rest of the hash computations, to match the security level the bit-length of the initial hash function G should be double that of the hash function H. This is done so that the difficulty faced by the sender to send undeniable messages is the same difficulty faced by an attacker to forge a message signature pair. In practice, one can use only function G and truncate the output to the required value.

Figure 5:
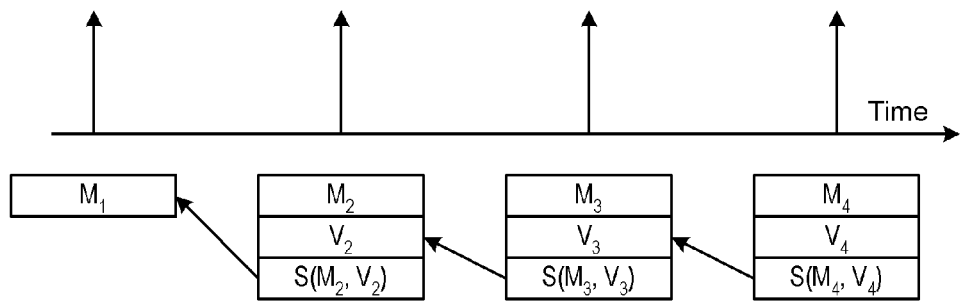
FIG. 5 illustrates a W-OTS broadcast scheme of chaining messages and verifiers.

FIG. 5 illustrates a W-OTS broadcast scheme of chaining messages/verifiers. As shown in FIG. 5, a first verifier $V_1$ is used to verify a second packet. Each successive packet in the sequence uses the previous verifier for verification. If a packet is lost such that the sequence is lost, then the lost packet will create a break the chain and any subsequent packets following the lost packet cannot be verified using the W-OTS authentication scheme.

Figure 6:
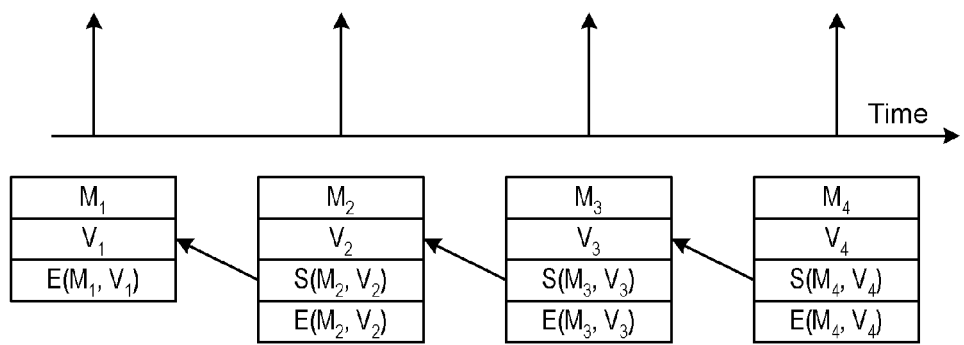
FIG. 6 illustrates a combined W-OTS and ECDSA broadcast scheme of chaining messages and verifiers.

FIG. 6 illustrates a combined W-OTS and ECDSA authentication scheme. Each message is originally signed using a W-OTS signature and also an ECDSA signature. Each packet contains a respective message $M_x$, one W-OTS verifier $V_x$, and the W-OTS signature $S(M_x, V_x)$ over the message $M_x$ and verifier $V_x$. Each W-OTS signature is verified with the previous verifier $V_{x-1}$ in the chain.

ECDSA signatures can be verified independently. The ECDSA signature is straightforward such that any verifier receiving the first message can verify the ECDSA signature over the message $M_x$ and the W-OTS verifier V. Subsequent messages in the chain are verified using the W-OTS signature. In the event a packet is lost breaking the sequential chain, the next message will be verified using the ECDSA signature. Once the next message is verified using the ECDSA signature, subsequent messages following the message authenticated by the ECDSA signature are verified using the W-OTS signature. Verification of messages using the W-OTS authentication scheme continues until a next packet loss occurs, which at that time, the ECDSA signature will be used. The fused scheme is continued for all subsequent signatures. The utilization of the ECDSA signature when the chain is broken makes the combined authentication scheme robust to packet loss and also re-synchronizes the chain.

The following describes the construction for the signing and verification steps and packet format. For the signature operation, referring to FIG. 6, a packet consists of message $M_x$ and the W-OTS verifier $V_x$, and both the message and the verifier are signed using both the W-OTS signature and the ECDSA signature. The W-OTS signature is verified by the earlier committed W-OTS verifier in the chain. The ECDSA signature is verified by the ECDSA public key.

In regards to the packet format, the message $M_x$ consists of the actual payload with timestamp and sequence number. The format of the message $M_x$ is as follows:
$M_x$:P(actual payload)|T(timestamp)|i(sequence number).
The sequence number i maintains an order of the chain in which the W-OTS verifiers $V_x$ are used. Timestamp and sequence number together guard against replay attack. Although the combined scheme does not require that the first message $M_1$ contain a W-OTS signature (FIG. 6), to maintain packet length equal for all the packets, a field of the size of a W-OTS signature can be inserted.

To verify a signature, the following steps are used by a verifier:
 (1) Verify a digital certificate of the ECDSA public key issued by the trusted third party. This step authenticates the ECDSA public key and binds the owner identity with the ECDSA public key.
 (2) Verify the ECDSA signature with the certified ECDSA public key on the first message $M_1$ and W-OTS verifier $V_1$ from any sender. This step authenticates the message and also the W-OTS verifier.
 (3) Verify the W-OTS signature only for the subsequent messages. If the authentic verifier $V_1$ is available then the W-OTS signature of the (i+1)-th packet authenticates the message $M_{i+1}$ and the W-OTS verifier $V_{i+1}$ both.
 (4) If any packet is lost, then the continuity of the W-OTS chain is lost and the next packet must be verified with the ECDSA signature.

The fused schemes as discussed above combines the advantages of both the ECDSA and W-OTS to overcome the deficiencies of each individual scheme.

Figure 7:
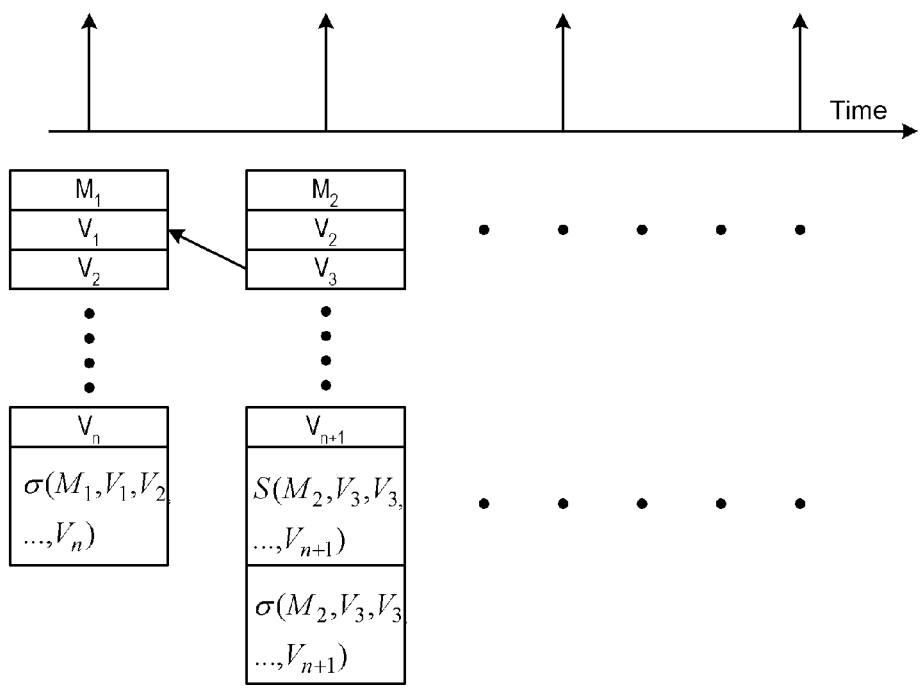
FIG. 7 illustrates a combined W-OTS and ECDSA broadcast scheme of chaining messages and multiple verifiers.

FIG. 7 illustrates an embodiment where multiple verifiers are transmitted in a respective packet. For example, in an "n" verifier case where n=2, 3, etc, if the consequent "n" packets are lost, then the (n+1)th packet will be verified using ECDSA.

Figure 8:
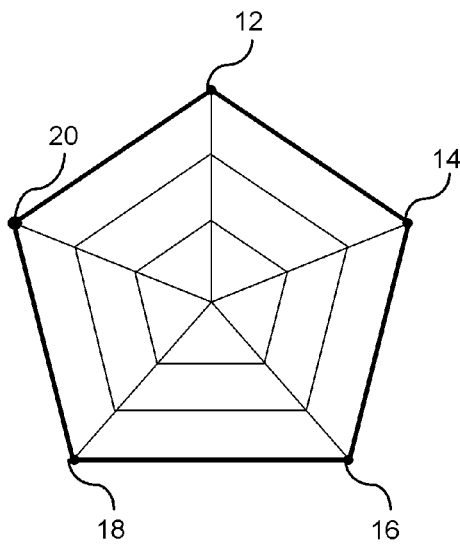
FIG. 8 illustrates a robustness property diagram for W-OTS broadcast algorithm scheme and ECDSA broadcast algorithm scheme.

FIG. 8 illustrates a robustness property diagram for W-OTS broadcast algorithm scheme and ECDSA broadcast algorithm scheme. The robustness of the fused schemes with respect to the properties is provided herein.

In regards to delayed verification, since both the W-OTS signature and the ECDSA signature can be verified instantly, and in the proposed scheme at least one of these signatures are verified, then the combined scheme does not suffer from delayed authentication.

In regards to packet loss, the combined scheme is robust against packet loss. Though the W-OTS chain is broken in the event of a packet loss, the subsequent verification is performed using the ECDSA signature which authenticates the message and the W-OTS verifier once again. Therefore, a packet loss does not terminate a verification of subsequent packets.

In regards to computational DoS attack, the combined scheme is resilient to computational DoS under low message loss environments since most of the packets are authenticated by computationally inexpensive W-OTS signatures. For computational DoS attack that is a drawback of ECDSA, each message verified using the W-OTS signature is resilient against computational DoS attack. Therefore, resilience to computational DoS attack is ensured. Time-stamping and sequencing every packet makes the scheme robust against replay attack.

In regards to non-repudiation, the combined scheme allows a receiver to prove to a trusted third party that the sender is accountable for generating a message. This scheme provides non-repudiation provided a trace of the messages is provided by the receiver to a third party. For example, if the receiver verifies the ECDSA signature on the message and the W-OTS verifier of the k-th packet, then to prove to a third party that the i-th (i>k) packet has been generated by the sender, the verifier has to store all the (i−k+1) packets starting from k. The non-repudiation property is enabled by obtaining a digital certificate form a trusted third party on the ECDSA public key. Once the public key is used to sign a W-OTS verifier and this respective W-OTS verifier is used to verify another message $M_x$ signed using W-OTS signature, then the message and signature pair using the $M_x$ and $S(M_x)$ are bound to the ECDSA public key and hence to the signer identity. As a result, the non-repudiation property for each message is ensured.

In regards to support for mobility, the combined scheme supports a dynamic receiver set. Any verifier that comes in range of a sender can start verifying messages once the receiver has verified the digital certificate of the ECDSA public key. This property is particularly suitable for vehicular networks where the nodes have very high mobility and the receiver set of a particular sender changes frequently. The signer needs to transmit its digital certificate of the ECDSA public key form time-to-time and this requirement is the same as a true ECDSA based broadcast authentication.

FIG. 9 illustrates a detailed flow process for authenticating broadcast messages utilizing the fused broadcast authentication scheme. Steps 30-34 as follows relate to the message generation, message signing, and transmission.

In step 30, a message $M_1$ is generated by a sender. In step 31, a set of Winternitz private and public keys are generated. The public key or verifier is designated as $V_1$. The private key is designated as $W_1$.

In step 32, $M_1$ is concatenated with $V_1$.

In step 33, message $M_1$ is signed using an ECDSA private key. In step 34, the message $M_1$ is broadcast with the ECDSA signature. It is noted that the W-OTS signature is not used as a signature for the first message.

In step 35, a second message $M_2$ is generated. In step 36, a second set of Winternitz keys is generated. The public key or verifier is designated as $V_2$. The private key is designated as $W_2$.

In step 37, $M_2$ is concatenated with $V_2$.

In step 38, message $M_2$ is signed using an ECDSA private key and the Winternitz private key $W_1$. In step 38, the message $M_2$ is broadcast with the ECDSA signature and the Winternitz signature.

In step 39, subsequent messages are generated and signed using private ECDSA signature and a respective Winternitz signature generated by a sequentially generated private key as described above.

Steps 40-44 as follows relate to receiving the message and authenticating the signature of the message.

In step 40, the first message $M_1$ is received by a remote entity. In step 41, the signature of the first message $M_1$ is verified using the ECDSA signature. This step authenticates the Winternitz public key $V_1$.

In step 42, a next message $M_2$ is received.

In step 43, a determination is made whether the previous Winternitz verifier is present as determined by the sequential numbering of the current message. That is, the routine will determine the sequential numbering of the current message with respect to the sequential numbering of the previous verifier. If the determination is made that the current received message $M_2$ is in a sequential order with respect to the previously received verifier $V_1$, then the routine proceeds to step 44 wherein only the Winternitz signature is used to authenticate the message. If the determination is made that sequential order of the message with respect to the last received verifier does not follow the sequential order thereby indicating that a packet loss has occurred, then the routine proceeds to step 41 where the ECDSA signature is used to authenticate the message.

The routine will continue to receive messages and will utilize only the Winternitz signature to verify the current received message from the sender so long as a determination is made that a packet loss has not occurred. If a packet loss has occurred, then the ECDSA signature is used to authenticate the message. The verification of the ECDSA signature for a respective message authenticates the Winternitz signature so that only the Winternitz signature can be used for authentication of the message until a next packet loss occurs.

While certain embodiments of the present invention have been described in detail, those familiar with the art to which this invention relates will recognize various alternative designs and embodiments for practicing the invention as defined by the following claims.

What is claimed is:
1. A method of authenticating a digitally signed message, the method comprising the steps of:
generating a chain of messages in a sender;
generating a Winternitz pair of keys for each respective message;

assigning a sequence number to each of the messages, each of the sequence numbers cooperatively identifying an order of Winternitz verifiers assigned to each of the messages;

digitally signing a signature to a first message in the chain of messages using a digital signature algorithm private key;

digitally signing signatures to each of the following messages in the chain of messages using both Winternitz private keys and digital signature algorithm private keys;

the sender broadcasting the signed messages to a receiver via a wireless communication channel;

authenticating the first signed broadcast message at the receiver by verifying the digital signature algorithm signature; and authenticating at least some of the following signed broadcast messages at the receiver by verifying only the Winternitz signature.

2. The method of claim 1 wherein a current received message in the chain of messages broadcast by the sender is authenticated using only the Winternitz signature if a Winternitz verifier for a received message immediately preceding the current received message follows the sequential order of verifiers.

3. The method of claim 2 wherein a respective message in the chain of messages broadcast by the sender is authenticated using only the digital signature algorithm signature if a Winternitz verifier for a received message immediately preceding the current message fails to follow the sequential order of verifiers.

4. The method of claim 2 wherein if a broadcast message is lost as determined by the sequential order of the Winternitz verifiers in the chain of messages, then the current message following a lost broadcast message is authenticated using the digital signature algorithm signature, and wherein the remaining chain of messages sequentially following the current message are verified using only the Winternitz signature of each message.

5. The method of claim 1 wherein the Winternitz signature is a Winternitz one time signature, wherein a respective set of keys is used to generate and sign only one message.

6. The method of claim 1 wherein if the sequential order of the chain of messages received by the receiver is not maintained, then the digital signature algorithm signature is used to verify a current received message.

7. The method of claim 1 wherein the digital signature algorithm includes an elliptical digital signature algorithm.

8. The method of claim 1 wherein the digital signature algorithm includes RSA cryptography.

9. The method of claim 1 wherein the digital signature algorithm includes a signature algorithm having substantially same properties of ECDSA.

10. A method of authenticating a digitally signed message comprising the steps of:
generating a first message in a sender;
generating a first set of Winternitz keys;
concatenating a verifier with the first message;
assigning a first sequential number to the message and verifier;
digitally signing the message using a digital signature algorithm private key via a wireless communication channel;
the sender broadcasting the first message to a remote entity via the wireless communication channel;
the sender generating a second message;
generating a second set of Winternitz keys;
concatenating a second verifier with the second message;
assigning a second sequential number to the second message and second verifier;
digitally signing the second message using a first Winternitz private key and the digital signature algorithm private key;
the sender transmitting the second digital message with the Winternitz signature and the digital signature algorithm signature via the wireless communication channel;
receiving the first and second message by a receiver in the remote entity;
verifying the first message using the digital signature algorithm signature; and
verifying the second message using only the Winternitz signature in response to obtaining a sequentially identified verifier of the first message.

11. The method of claim 9 wherein a next message is generated and signed using a next Winternitz private key and the digital signature algorithm private key, wherein the next consecutive message is broadcast using both the next Winternitz signature and the digital signature algorithm signature, and wherein the next message is verified using only the next Winternitz signature if a remote entity obtained the sequentially identified verifier of second message.

12. The method of claim 9 wherein the next consecutive message is authenticated using digital signature algorithm signature in response to the receiving entity not receiving the sequentially identified verifier of the second message.

13. The method of claim 10 wherein each following message is authenticated using only a respective Winternitz signature if an associated sequential ordered verifier from a previous message is received by the receiving entity.

14. The method of claim 11 wherein a respective digital signature algorithm signature for a current message is used to authenticate the current message when an improper sequencing of the verifiers is present between the previously received message and the current message.

15. The method of claim 9 wherein a sequence number is assigned to both a verifier and a message for identifying a sequential order in the chain of broadcast messages.

16. The method of claim 9 wherein the Winternitz set of keys includes a private key and a public key, wherein public key is used as the verifier.

17. The method of claim 9 wherein the Winternitz signature is a Winternitz one time signature, wherein a respective set of keys is used to generate and sign only one message.

18. The method of claim 9 wherein the digital signature algorithm includes an elliptical digital signature algorithm.

19. The method of claim 9 wherein the digital signature algorithm includes RSA cryptography.

20. The method of claim 9 wherein the digital signature algorithm includes a signature algorithm having substantially same properties of ECDSA.

* * * * *